United States Patent
Husveg

(10) Patent No.: US 8,770,228 B2
(45) Date of Patent: Jul. 8, 2014

(54) CHOKE VALVE DEVICE

(75) Inventor: Trygve Husveg, Varhaug (NO)

(73) Assignee: Typhonix AS, Stavanger (NO)

( * ) Notice: Subject to any disclaimer, the term of this patent is extended or adjusted under 35 U.S.C. 154(b) by 722 days.

(21) Appl. No.: 12/064,611

(22) PCT Filed: Aug. 14, 2006

(86) PCT No.: PCT/NO2006/000294
§ 371 (c)(1),
(2), (4) Date: Feb. 22, 2008

(87) PCT Pub. No.: WO2007/024138
PCT Pub. Date: Mar. 1, 2007

(65) Prior Publication Data
US 2008/0245429 A1  Oct. 9, 2008

(30) Foreign Application Priority Data
Aug. 23, 2005 (NO) .................................. 20053930

(51) Int. Cl.
- *F15C 1/16* (2006.01)
- *B01D 17/02* (2006.01)
- *B04C 3/06* (2006.01)
- *F15D 1/02* (2006.01)
- *F16K 47/08* (2006.01)

(52) U.S. Cl.
USPC .......................................... 137/813; 138/39

(58) Field of Classification Search
CPC .......... F15C 1/16; F15C 1/0015; B04C 3/00; B04C 3/06; G05D 7/0186; B01D 17/0217
USPC ............ 137/812, 813, 808, 810, 811; 138/39, 138/44
See application file for complete search history.

(56) References Cited

U.S. PATENT DOCUMENTS

| | | | |
|---|---|---|---|
| 325,001 A | 11/1928 | Shaffer | |
| 2,598,187 A | 5/1952 | Meyer | |
| 2,626,425 A * | 1/1953 | Hawthorne, Jr. et al. | ....... 65/526 |
| 3,007,542 A | 11/1961 | Giampapa et al. | |
| 3,458,170 A | 7/1969 | Vogeli | |

(Continued)

FOREIGN PATENT DOCUMENTS

| | | | |
|---|---|---|---|
| DE | 1600878 C2 * | 7/1970 | ............... F16K 1/54 |
| DE | 9320686 | 11/1994 | |

(Continued)

OTHER PUBLICATIONS

Supplementary European Search Report for EP 06 76 9461, completed Aug. 13, 2009.

*Primary Examiner* — Craig Schneider
(74) *Attorney, Agent, or Firm* — Diederiks & Whitelaw, PLC

(57) ABSTRACT

An arrangement for a control valve for controlling pressure and flow rate of a fluid, the fluid flowing via an inlet into the control valve being brought to rotate about a main flow axis before the fluid, at least with reduced pressure or speed energy, flows via an outlet opening from the control valve and where at least one inlet port communicating with the inlet being provided tangentially in relation to an inlet portion of the speed reduction chamber located in the control valve, and where the speed reduction chamber, provided substantially concentric with the main flow axis, is divergent over at least the first portion of the main flow direction.

20 Claims, 4 Drawing Sheets

(56) References Cited

U.S. PATENT DOCUMENTS

| | | | |
|---|---|---|---|
| 4,112,977 A * | 9/1978 | Syred et al. | 137/812 |
| 4,378,289 A * | 3/1983 | Hunter | 209/722 |
| 4,585,465 A | 4/1986 | Suzuki et al. | |
| 5,012,841 A | 5/1991 | Kueffer | |
| 5,043,177 A | 8/1991 | Chimel et al. | |
| 5,365,962 A * | 11/1994 | Taylor | 137/14 |
| 5,573,029 A * | 11/1996 | Freimann | 137/1 |
| 5,605,172 A | 2/1997 | Schubert et al. | |
| 6,024,874 A * | 2/2000 | Lott | 210/512.1 |
| 2004/0216785 A1 * | 11/2004 | Bowe et al. | 137/599.12 |

FOREIGN PATENT DOCUMENTS

| | | |
|---|---|---|
| EP | 0 075 212 A2 | 3/1983 |
| EP | 0 715 871 A | 6/1996 |
| FR | 2 588 778 A1 | 4/1987 |
| GB | 600225 | 4/1948 |
| JP | 64-069869 | 3/1989 |
| WO | WO 02/084154 A1 | 10/2002 |
| WO | WO 04/001260 A1 | 12/2003 |
| WO | WO 2006/070020 | 7/2006 |
| WO | WO 2006/089948 | 8/2006 |
| WO | WO 2007/024138 | 3/2007 |

* cited by examiner

III-III

III-III

CHOKE VALVE DEVICE

CROSS-REFERENCE TO RELATED APPLICATIONS

This application claims benefit and priority to and is a U.S. National Phase of PCT International Application Number PCT/NO2006/000294, filed on Aug. 14, 2006, which claims priority to Norwegian Patent Application No. NO 20053930 filed on Aug. 23, 2005. The disclosures of the above-referenced applications are hereby expressly incorporated by reference in their entirety.

FIELD OF THE INVENTION

The invention relates to a control valve. More particularly it concerns a control valve for controlling pressure and flow rate of a fluid, where the fluid flowing via an inlet into the control valve is brought to rotate about a main flow axis, and where the fluid, at least at reduced pressure or speed energy, flows out of the control valve via an outlet. At least one inlet port, communicating with the inlet, is provided, preferably tangentially, at a radial distance from the main flow axis, and at an inlet portion of a speed reduction chamber located in the control valve, the speed reduction chamber, provided substantially concentric with the main flow axis, diverging over at least the first portion of the main flow direction.

The control valve according to the invention is well suited to a wide range of applications. Petroleum related applications are the basis for the following, but this in no way limits the scope of the invention.

BACKGROUND OF THE INVENTION

In the production of petroleum, the well fluid often contains considerable quantities of water. In a last production phase from a well it is not uncommon for water to represent up to 90% of the well flow.

Water and petroleum are separated in several steps after the well fluid has flowed out from the well. Before this separation can take place and also between the various steps it is necessary, however, to control the flow rate and the fluid pressure.

This type of control is typically performed by means of a control valve positioned in the flow path in front of the process step in question.

A theoretical description of a separation process between non-mixable fluids is usually based on Stoke's law:

$$V_t = \frac{g \cdot D^2 \cdot (\rho_1 - \rho_2)}{18 \cdot \mu} \left[\frac{m}{s}\right]$$

For oil/water separation $V_t$ is the rate of ascent of an oil droplet in water, g is gravity, D is droplet diameter, $\rho_1$ is specific gravity of the continuous phase (water), $\rho_2$ is specific gravity of the dispersed phase (oil) and $\mu$ is the viscosity of the continuous phase.

Stoke's law shows that the theoretical efficiency of a separation process increases by the square of the droplet size in the dispersed phase. It is thus of considerable significance that the control valve to the least possible degree reduces the droplet size of the phases in the fluid flowing therethrough.

Prior art control valves inflicts relatively large shear forces on the fluid. The reason for this is, among other things, that the energy loss rate is large, i.e. the fluid energy, e.g. in the form of speed and pressure energy, is lost too quickly. Fluids flowing through prior art choke valves show a substantial reduction of the droplet size(s) in the dispersed fluid phase(s).

SUMMARY OF THE INVENTION

The object of the invention is to remedy or reduce at least one of the prior art drawbacks.

The object is achieved according to the invention by the features given in the description below and in the following claims.

In a control valve for controlling pressure and flow rate, the fluid, which via an inlet flows into the control valve, is brought to rotate about a main flow axis before the flow, at least with reduced pressure or flow rate energy, flows out from the control valve via an outlet. At least one inlet port, communicating with the inlet, is provided preferably tangentially at a radial distance from the main flow axis, and at an inlet portion of a speed reduction chamber located in the control valve. The speed reduction chamber, provided substantially concentric with the main flow axis, is divergent over at least the first portion of the main flow direction.

The main flow direction of the fluid coincides essentially with the main flow axis in the direction from the inlet portion of the speed reduction chamber and to the outlet portion of the speed reduction chamber.

Advantageously the speed reduction chamber is essentially designed without internal bodies.

The fluid, being given a rotation about the main flow axis in the inlet port, takes up an increasing diameter of rotation and is thus given a lower speed of rotation and also lower flow speed in the main flow direction as it flows through the speed reduction chamber, due to the increasing diameter of the speed reduction chamber in the main flow direction.

The increase in diameter of the speed reduction chamber in the main flow direction may be exponential whereby the speed reduction chamber becomes hyperboloid, it may be linear, giving it a conical shape, or it may be a mixture of these two types of volume. The increase in diameter may moreover be stepwise. All these geometrical shapes are included in the term divergent which may also include other suitable shapes.

Outlet(s) from the speed reduction chamber is (are) typically positioned in the centre of the retardation chamber, but may also be disposed at the periphery of the speed reduction chamber or at an intermediate position. Outlet(s) may be arranged axially and/or tangentially in relation to the main flow axis.

The at least one inlet port of the control valve may advantageously be controllable, e.g. by the inlet port cross-section being adjustable. The inlet port is typically in a controllable flow inlet valve.

The inlet port may include control wings or other flow controlling objects. It is further possible that the inlet port is axial but controlled to effect the fluid to be given the necessary rotational movement into the inlet portion of the speed reduction chamber.

The inlet port/ports are, as mentioned earlier, most advantageously disposed at the inlet portion of the speed reduction chamber. For geometric adaptation of the inlet portion to the speed reduction chamber, it may be necessary to let the inlet portion constitute a transition in this area. The inlet portion may be cylindrical or convergent in the main flow direction.

Tests have shown that control in a control valve according to the invention reduces the droplet size in the dispersed phase considerably less than by use of a prior art choke valve.

BRIEF DESCRIPTION OF DRAWINGS

In the following is given a non-limiting example of a preferred embodiment illustrated in the enclosed drawings, where.

DETAILED DESCRIPTION OF THE PREFERRED EMBODIMENTS

Figure 1:
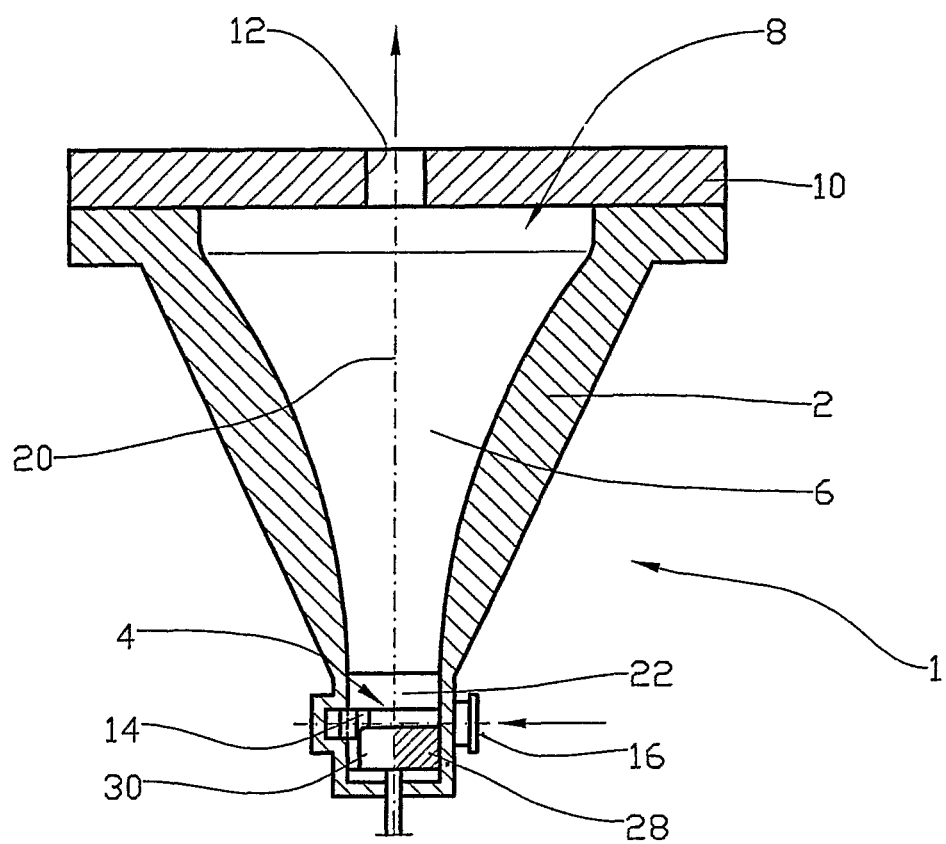
FIG. 1 shows an axial section through a control valve of the invention where the inlet valve of the control valve is shown in section III-III of FIG. 3.
Figure 2:
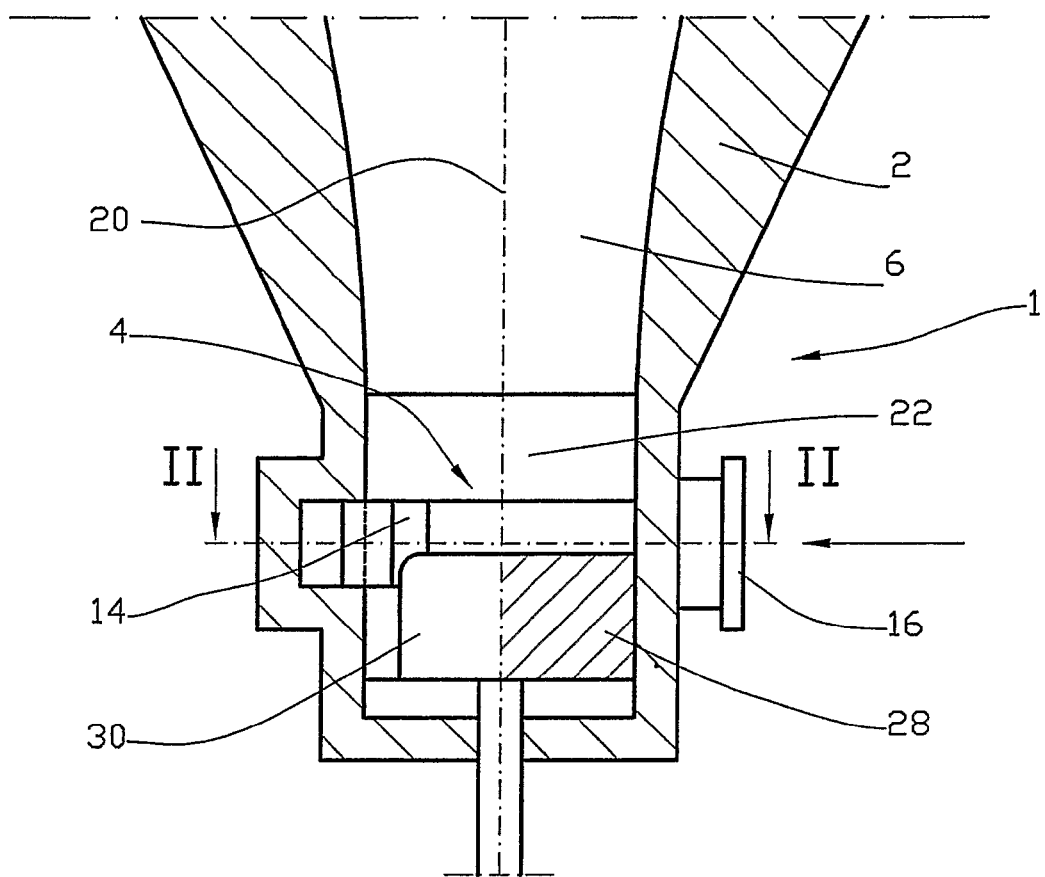
FIG. 2 shows a part of FIG. 1 at a larger scale.

In the drawings, reference numeral 1 denotes a control valve where a valve housing 2 of the control valve 1 comprises an inlet valve 4 and a speed reduction chamber 6 disposed downstream relative to the inlet valve 4.

The inlet valve 4 is positioned in an end portion of the valve housing 2. In the opposing end portion of the valve housing 2, the outlet portion 8 is provided with a sealing end plate 10. The end plate 10 has a central outlet through opening 127.

Figure 3:
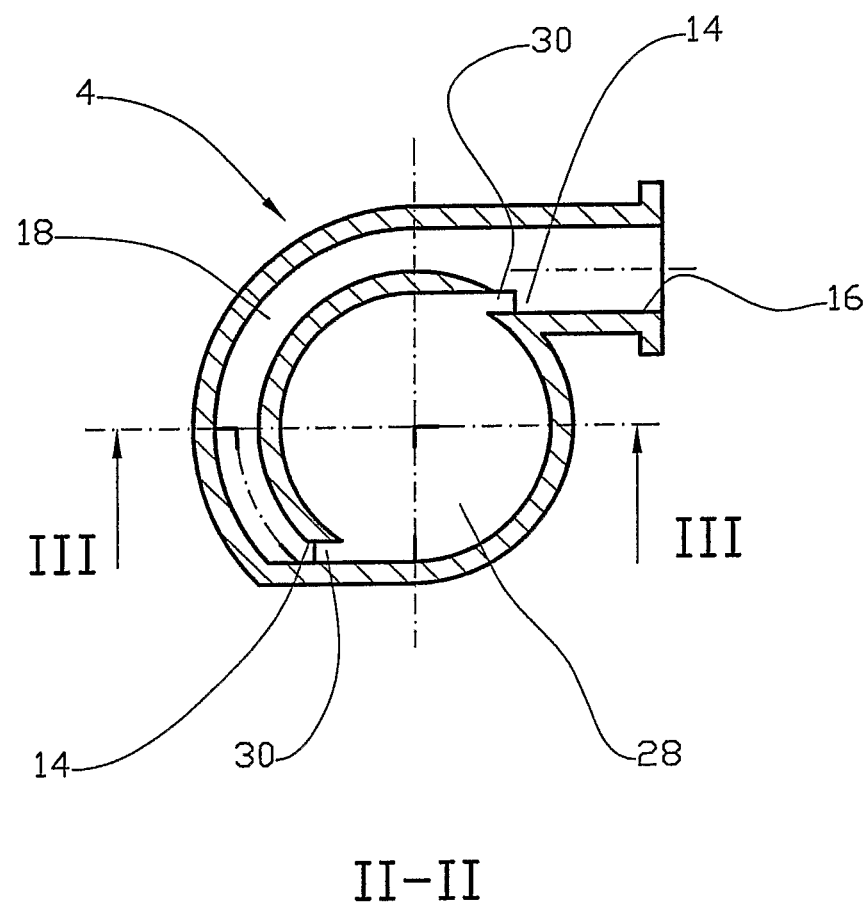
FIG. 3 shows a section II-II of FIG. 2.

The inlet valve 4 in this preferred embodiment is provided with two tangential inlet ports 14, see FIG. 3. Fluid flows into the inlet valve 4 via the inlet 16, inlet channels 18 and to the inlet ports 14 where the fluid due to its tangential flow into the inlet portion 22 of the speed reduction chamber 6 is made to rotate strongly about a main flow axis 20 which essentially coincides with the centre axis of the speed reduction chamber 6.

Fluid flows rotationally about the main flow axis 20 from the inlet ports 14, via the inlet portion 22 in the main flow direction through the speed reduction chamber 6 towards the outlet potion 8 of the choke valve 1 as the rotational speed of the fluid is reduced with increasing diameter along the speed reduction chamber 6.

Figure 4:
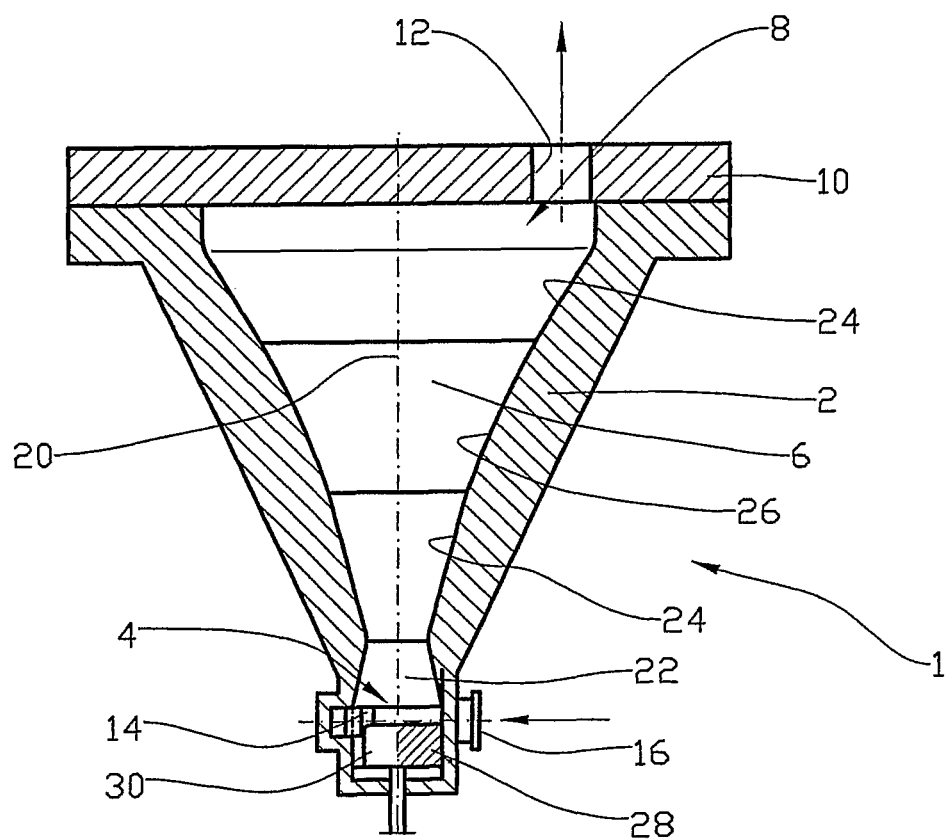
FIG. 4 shows an axial section of a control valve in an alternative embodiment.

In an alternative embodiment, see FIG. 4, the speed reduction chamber 6 is provided with two conical portions 24 and one hyperboloid portion 26 while the outlet opening 12 is positioned at the periphery of the speed reduction chamber 6. The speed reduction chamber 6 is designed as shown to impart a favourable retardation to the relevant fluid.

The inlet valve 4 is provided with a control piston 28 adjustably movable in the axial direction of the control valve 1. The control piston 28 includes projections 30 protruding into the corresponding inlet ports 14. A displacement of the control piston 28 changes the cross-section of the inlet ports 14.

What is claimed is:

1. A control valve for controlling a pressure and a flow rate of a fluid, comprising:
   an inlet;
   a speed reduction chamber having an inlet portion extending from the inlet; and
   an outlet,
   wherein fluid flowing from the inlet is brought to rotate about a main flow axis before flowing out of the outlet via the speed reduction chamber at a reduced pressure or flow rate, the speed reduction chamber being substantially concentric with the main flow axis and being in part divergent along the main flow axis, wherein the inlet portion of the speed reduction chamber is a void convergent along the main flow axis, wherein the speed reduction chamber has a hyperboloid divergent portion leading to the outlet, with the hyperboloid divergent portion having a maximum diameter greater than a maximum diameter of the inlet portion, and wherein a controllable flow inlet valve is disposed between the inlet and the inlet portion of the speed reduction chamber and wherein the speed reduction chamber has a conical divergent portion between the inlet portion and the hyperboloid divergent portion.

2. A control valve for controlling a pressure and a flow rate of a fluid, comprising:
   an inlet;
   at least one inlet channel;
   at least one inlet port;
   a controllable flow inlet valve configured to adjust fluid flow from the inlet and the at least one inlet channel through the at least one inlet port; and
   a speed reduction chamber having an inlet portion, configured to receive fluid tangentially from the at least one inlet port, extending continuously to an outlet,
   wherein fluid flowing from the inlet is brought to rotate about a main flow axis by the at least one inlet channel and the at least one inlet port before flowing out of the outlet via the speed reduction chamber at a reduced pressure or flow rate, the speed reduction chamber being substantially concentric with the main flow axis and being in part divergent along the main flow axis, wherein the inlet portion of the speed reduction chamber is convergent along the main flow axis, wherein the speed reduction chamber has a hyperboloid divergent portion leading to the outlet, with the hyperboloid divergent portion having a maximum diameter greater than a maximum diameter of the inlet portion and a minimum diameter greater than a diameter of the outlet, and wherein the controllable flow inlet valve is disposed between the inlet and the inlet portion of the speed reduction chamber.

3. The control valve as claimed in claim 2, wherein the inlet is axially oriented to the main flow axis.

4. The control valve as claimed in claim 2, wherein the speed reduction chamber is essentially free of internal bodies.

5. The control valve as claimed in claim 2, wherein the speed reduction chamber further has a first conical divergent portion and a second conical divergent portion, wherein the hyperboloid divergent portion is located between the first conical divergent portion and the second conical divergent portion and wherein the hyperboloid divergent portion prevents a large reduction in droplet size in a dispersed phase of the fluid as the flow rate reduces in speed.

6. The control valve as claimed in claim 2, wherein the inlet portion is directly adjacent the inlet such that fluid flows directly from the inlet into the speed reduction chamber as controlled by the control valve.

7. The control valve as claimed in claim 2, wherein the hyperboloid divergent portion has a length along the main flow axis greater than a distance between the inlet and an end of the inlet portion along the main flow axis.

8. The control valve as claimed in claim 2, wherein the inlet has an inlet port and an adjustable control piston for controlling the flow rate of the fluid into the speed reduction chamber.

9. The control valve as claimed in claim 8, wherein the control piston includes projections that protrude into the inlet ports when the control piston is displaced.

10. The control valve as claimed in claim 2, wherein the inlet is radially displaced from the main flow axis.

11. The control valve as claimed in claim 10, wherein the inlet is tangentially oriented to the main flow axis.

12. The control valve as claimed in claim 11, wherein the fluid contains droplets of a dispersed phase within a continuous phase.

13. A method of reducing a flow rate of a fluid comprising droplets of a dispersed phase within a continuous phase, the method comprising:

introducing the fluid into a control valve through an inlet, at least one inlet channel and at least one inlet port while causing the fluid to rotate around a main flow axis of a speed reduction chamber, the speed reduction chamber having an inlet portion extending from the inlet and receiving fluid tangentially from the at least one inlet port;

increasing the tangential velocity of the rotating fluid flow by introducing the fluid through a convergent portion of the control valve, the convergent portion of the control valve causing a reduction in the rotation radius of the fluid flow;

introducing the fluid into a hyperbolic divergent portion of the speed reduction chamber, with the hyperboloid divergent portion having a maximum diameter greater than a maximum diameter of the inlet portion and a minimum diameter greater than a diameter of an outlet of the control valve, so as to avoid a large reduction in the droplet size in the dispersed phase of the fluid; and controlling the fluid flow rate through the inlet by passing the fluid through a controllable flow inlet valve, disposed between the inlet and the inlet portion of the speed reduction chamber, to adjust fluid flow from the inlet and the at least one inlet channel through the at least one inlet port to the inlet portion and continuously to the outlet.

14. The method of claim 13, wherein the fluid is introduced in a direction that is axially oriented with the main flow axis.

15. The method of claim 13, wherein the fluid is introduced in a direction tangential to the main flow axis.

16. The method of claim 13, further comprising:
preventing a large reduction in the droplet size in the dispersed phase of the fluid as the fluid flow reduces in speed by passing the fluid through a first conical divergent portion, then through the hyperboloid divergent portion and then through a second conical divergent portion, wherein the hyperboloid divergent portion is located between the first conical divergent portion and the second conical divergent portion of the speed reduction chamber.

17. The method of claim 13, wherein the fluid flows directly from the inlet into the speed reduction chamber as controlled by the control valve.

18. The method of claim 13, wherein the fluid flows through the hyperboloid divergent portion for a distance, along the main flow axis, greater than a distance between the inlet and an end of the inlet portion along the main flow axis.

19. A method of reducing a flow rate of a fluid comprising droplets of a dispersed phase within a continuous phase, the method comprising:
introducing the fluid into a control valve through an inlet, the inlet causing the fluid to rotate around a main flow axis of a speed reduction chamber, the speed reduction chamber having an inlet portion extending from the inlet;

increasing the tangential velocity of the rotating fluid flow by introducing the fluid through a convergent portion of the control valve, the convergent portion of the control valve causing a reduction in the rotation radius of the fluid flow;

introducing the fluid into a hyperbolic divergent portion of the speed reduction chamber, with the hyperboloid divergent portion having a maximum diameter greater than a maximum diameter of the inlet portion, so as to avoid a large reduction in the droplet size in the dispersed phase of the fluid;

controlling the fluid flow rate through the inlet by passing the fluid through a controllable flow inlet valve prior to introducing the fluid through the inlet; and removing the fluid from the control valve through an outlet provided in an end plate, said end plate sealing said control valve.

20. The method of claim 19, further comprising removing the fluid through the outlet positioned in the end plate at a position which does not coincide with the main flow axis of the speed reduction chamber.

* * * * *